United States Patent
Yoshida

(10) Patent No.: US 10,516,344 B2
(45) Date of Patent: Dec. 24, 2019

(54) CONVERTOR APPARATUS CONFIGURED TO OPTIMIZE INITIAL CHARGING TIME OF DC LINK CAPACITOR

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/963,793

(22) Filed: Apr. 26, 2018

(65) Prior Publication Data

US 2018/0316275 A1 Nov. 1, 2018

(30) Foreign Application Priority Data

May 1, 2017 (JP) .................. 2017-091223

(51) Int. Cl.
*H02M 7/217* (2006.01)
*H02M 1/00* (2006.01)
(Continued)

(52) U.S. Cl.
CPC ............. *H02M 7/217* (2013.01); *H02M 1/00* (2013.01); *H02M 7/125* (2013.01);
(Continued)

(58) Field of Classification Search
CPC ........ H02M 7/217; H02M 7/125; H02M 1/00; H02M 2001/0009; H02M 2001/0025; H02M 5/453; H02H 7/1257
(Continued)

(56) References Cited

U.S. PATENT DOCUMENTS 5,631,813 A * 5/1997 Ikeshita .................. H02P 23/06
363/37
6,157,097 A * 12/2000 Hirose .................. H02M 7/062
307/125
(Continued)

FOREIGN PATENT DOCUMENTS

CN 1241320 A 1/2000
CN 103151909 A 6/2013
(Continued)

OTHER PUBLICATIONS

Received STIC search report from EIC 2800 searcher Benjamin Martin dated Nov. 20, 2018. (Year: 2018).*

*Primary Examiner* — Nguyen Tran
*Assistant Examiner* — Htet Z Kyaw
(74) *Attorney, Agent, or Firm* — RatnerPrestia

(57) ABSTRACT

A convertor apparatus includes: a main circuit unit which converts an alternating current to a direct current and outputs the same to a DC link; a DC link capacitor; an alternating current voltage detection unit which detects an alternating current voltage crest value of the main circuit unit; a DC link capacitor voltage detection unit which detects a DC link capacitor voltage value; an initial charging unit which includes a switch for opening and closing an electrical path between the main circuit unit and the DC link capacitor and a charging resistor; a current detection unit which detects a current value flowing into the main circuit unit or flowing out of the main circuit unit; and a voltage reference value setting unit which sets the voltage reference value in accordance with the current value when the switch is adapted from to be opened into to be closed.

7 Claims, 4 Drawing Sheets

(51) Int. Cl.
*H02M 7/12* (2006.01)
*H02H 7/125* (2006.01)

(52) U.S. Cl.
CPC ... *H02H 7/1257* (2013.01); *H02M 2001/0009* (2013.01); *H02M 2001/0025* (2013.01)

(58) Field of Classification Search
USPC .......................... 363/89, 84, 53, 44; 323/908
See application file for complete search history.

(56) References Cited

U.S. PATENT DOCUMENTS

| | | | | |
|---|---|---|---|---|
| 6,611,126 | B2* | 8/2003 | Mizuno | B29C 45/7666 |
| | | | | 264/328.1 |
| 7,911,352 | B2* | 3/2011 | Bucella | H02H 11/006 |
| | | | | 323/205 |
| 7,929,323 | B2* | 4/2011 | Schmidt | H02M 7/062 |
| | | | | 363/125 |
| 9,276,467 | B2 | 3/2016 | Komiya | |
| 9,444,373 | B2 | 9/2016 | Yamamoto | |
| 9,837,949 | B2 | 12/2017 | Kumamoto et al. | |
| 9,859,809 | B2* | 1/2018 | Ichihara | H02M 5/458 |
| 2008/0185999 | A1 | 8/2008 | Matsukawa et al. | |
| 2009/0128347 | A1 | 5/2009 | Bucella et al. | |
| 2012/0206433 | A1* | 8/2012 | Suzuki | H05B 33/0815 |
| | | | | 345/212 |
| 2015/0043253 | A1* | 2/2015 | Awane | H02M 1/4258 |
| | | | | 363/37 |
| 2015/0236525 | A1* | 8/2015 | Aridome | G01R 31/3835 |
| | | | | 320/107 |
| 2015/0365019 | A1* | 12/2015 | Yamamoto | H02P 1/022 |
| | | | | 318/490 |
| 2016/0043713 | A1 | 2/2016 | Okuda et al. | |
| 2016/0072403 | A1* | 3/2016 | Niwa | H02M 1/4225 |
| | | | | 363/89 |
| 2018/0175611 | A1* | 6/2018 | Okamoto | H02H 1/0007 |

FOREIGN PATENT DOCUMENTS

| | | |
|---|---|---|
| CN | 105281643 A | 1/2016 |
| CN | 106253698 A | 12/2016 |
| EP | 2822132 A1 | 1/2015 |
| JP | H10304501 A | 11/1998 |
| JP | 2000-060127 A | 2/2000 |
| JP | 3418822 B2 | 6/2003 |
| JP | 2007074884 A | 3/2007 |
| JP | 2010178413 A | 8/2010 |
| JP | 2011087378 A | 4/2011 |
| JP | 2013-198172 A | 9/2013 |
| JP | 2013-219875 A | 10/2013 |
| JP | 2013207859 A | 10/2013 |
| JP | 2016039384 A | 3/2016 |
| JP | 2017005973 A | 1/2017 |

* cited by examiner

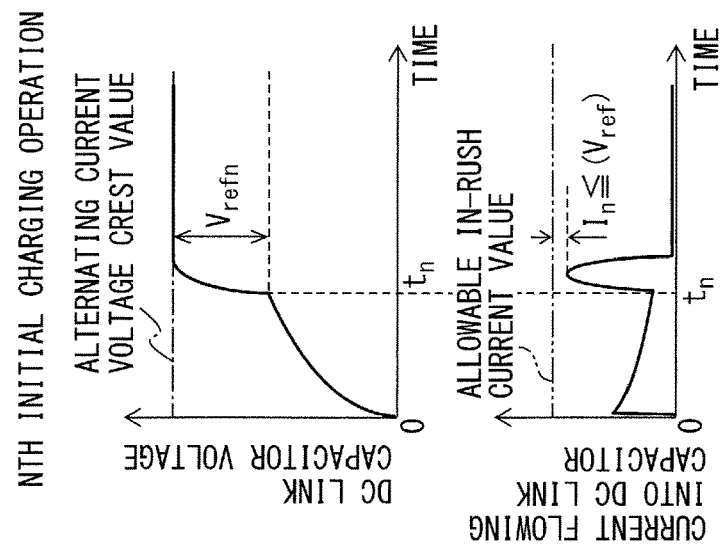
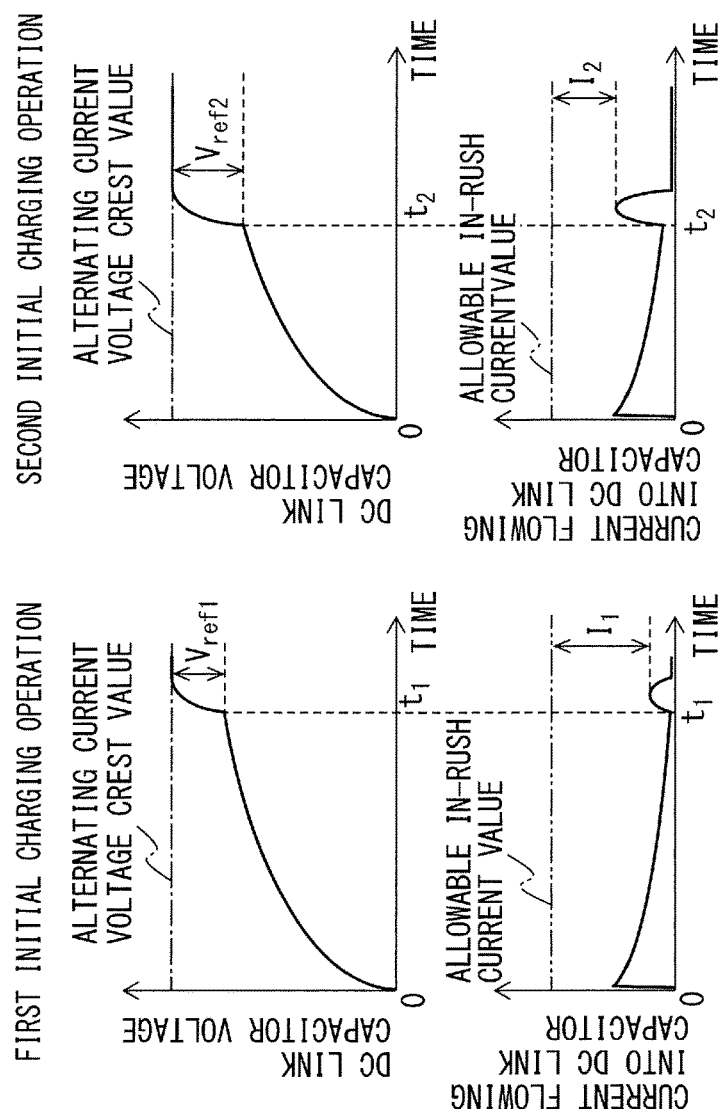

CONVERTOR APPARATUS CONFIGURED TO OPTIMIZE INITIAL CHARGING TIME OF DC LINK CAPACITOR

CROSS REFERENCE TO RELATED APPLICATION

This application is a new U.S. patent application that claims benefit of Japanese Patent Application No. 2017-091223, filed May 1, 2017, the disclosure of this application being incorporated herein by reference in its entirety for all purposes.

BACKGROUND OF THE INVENTION

1. Field of the Invention

The present invention relates to a convertor apparatus configured to optimize an initial charging time of a DC link capacitor.

2. Description of the Related Art

In a motor drive apparatus which drives a motor installed in a machine including a machine tool, a robot, etc., an alternating current inputted from an alternating current power supply is converted by a convertor apparatus (rectifier) to a direct current so as to be outputted to a DC link, further, a direct current of the DC link is converted by an inverter apparatus (inverter) to an alternating current, and a power of such an alternating current is used as a drive power of the motor.

To the DC link which connects a direct current output side of the convertor apparatus and a direct current input side of the inverter apparatus of the motor drive apparatus to each other, a DC link capacitor is provided. The DC link capacitor has a function of restraining a ripple portion of a direct current output of the convertor apparatus and a function of storing a direct current power used by the inverter apparatus so as to generate an alternating current.

The DC link capacitor is to be charged up immediately after the motor drive apparatus is started and before the motor is started to be driven (i.e., before a power conversion operation by the inverter apparatus is started). Such a charge is generally referred to as initial charge (or preliminary charge). An initial charge is performed by an initial charging unit including a switch and a charging resistor connected in parallel to the switch. The switch of the initial charging unit maintains a state to be opened (off) only during an initial charging period of the DC link capacitor immediately after the motor drive apparatus is started or to be closed (on) during a normal operation period in which the motor drive apparatus drives the motor. Further in detail, during the initial charging period immediately after the motor drive apparatus is started (immediately after the power is turned on) and before the motor is started to be driven, the switch is opened (off), whereby a direct current power outputted from the convertor apparatus flows through the charging resistor into the DC link capacitor, and the DC link capacitor is charged up. When the DC link capacitor is charged up to a certain voltage, the switch is adapted from to be opened into to be closed so as to complete an initial charging operation. When the initial charging operation is completed by adapting the switch of the initial charging unit from to be opened into to be closed, a large in-rush current in accordance with a difference (voltage difference) between a crest value of an alternating current voltage inputted and a DC link capacitor voltage value flows in the convertor apparatus.

Japanese Unexamined Patent Publication (Kokai) No. 2013-198172 indicates that "it is due to an operation of a smoothing capacitor for power supply noise absorption which is provided at a rear stage of a relay, and when a charging voltage of the capacitor is low while the relay is turned on, an in-rush current into the capacitor flows through the relay".

For example, as disclosed in Japanese Unexamined Patent Publication (Kokai) No. 2000-060127, there has been known an in-rush current restraining circuit provided with an in-rush current prevention unit including a current restraining resistance which restrains an alternating current from an alternating current power supply, a switching device which short circuits the resistance, and a switch control unit which controls the switching device to be turned on and off, a rectifier circuit which rectifies an alternating current voltage inputted through the in-rush current prevention unit, and a power factor improvement unit including a capacitor which applies a rectified output voltage by the rectifier circuit through a reactor and a diode, a switching transistor which performs switching in such a manner that the reactor stores energy and the energy is inputted to the capacitor through the diode, and a switching control unit which controls an on-time ratio of on and off of the switching transistor in such a manner that a current is detected and does not exceed a set current, in which there is provided a sequence control unit which controls a timing in such a manner that the switching device of the in-rush current prevention unit is turned off at a time at which an operation starts, after a certain time, an on and off operation of the switching transistor of the power factor improvement unit is started, and then, after a certain time, the switching device of the in-rush current prevention unit is turned on to short circuit the current restraining resistance.

Further, for example, as disclosed in Japanese Unexamined Patent Publication (Kokai) No. 2013-219875, there has been known a motor drive device including a convertor unit for converting an alternating current power of an alternating current power supply to a direct current power and an inverter unit for converting the direct current power converted by the convertor unit to a variable frequency alternating current power, in which the convertor unit includes: a power supply voltage monitoring unit which monitors voltages of respective phases of the alternating current power supply to detect a power failure; a DC link voltage detecting element which detects a low voltage by monitoring a DC link voltage; an element which calculates a total capacity of DC link smoothing capacitors provided for the convertor unit and the inverter unit; an element which varies, as necessary, a DC link low voltage alarm detection level for an instantaneous power failure; and an element which monitors the DC link voltage and, when the DC link voltage falls below the DC link low voltage alarm detection level, generates an alarm to protect the convertor unit, and when the power supply voltage monitoring unit of the alternating current power supply detects a power failure, the DC link low voltage alarm detection level is increased in accordance with the total capacity of the DC link smoothing capacitors.

In the convertor apparatus, there is employed a method in which when, a difference (i.e., voltage difference) between a crest value of an alternating current voltage inputted and a DC link capacitor voltage value amounts to a certain voltage reference value, the switch of the initial charging unit is adapted from to be opened into to be closed so as to complete the initial charging operation. In general, the smaller a power supply impedance is, the larger an in-rush current generated in the convertor apparatus when the switch of the initial charging unit is adapted from to be opened into to be closed becomes. Accordingly, a voltage reference value which serves as a determination reference of completion of the initial charging operation (i.e., determination reference whether or not to adapt the switch of the initial charging unit from to be opened into to be closed) has been set to be such a value that the power supply impedance is postulated to be "zero" in a unique manner which is the minimum value, and the in-rush current assumed to be generated under such a postulation does not exceed a maximum current (hereinafter referred to as "allowable in-rush current") which does not destroy the convertor apparatus.

However, in fact, the power supply impedance is not zero. In particular, when the power supply impedance is large, the in-rush current generated in the convertor apparatus when the switch of the initial charging unit is adapted from to be opened into to be closed becomes smaller in comparison with a case in which the power supply impedance is zero. Thus, a voltage reference value which is set under a postulation that the power supply impedance is zero can be considered to be a value which is set by fearing destruction of the convertor apparatus due to the in-rush current more than necessary when the power supply impedance is large, and there exists an excessive margin with respect to the allowable in-rush current which inherently pertains to the convertor apparatus. Further, the larger the power supply impedance is, the smaller a charging current becomes and the longer an initial charging time of the DC link capacitor becomes. Thus, the voltage reference value which is set by postulating the power to be "zero" in a unique manner cannot be considered to be always optimal.

SUMMARY OF INVENTION

In the convertor apparatus including the DC link capacitor at a direct current output side, there has been desired a technique of being capable of optimizing an initial charging time of the DC link capacitor regardless of a magnitude of a power supply impedance.

According to one aspect of the present disclosure, a convertor apparatus includes: a main circuit unit which converts an alternating current inputted from an alternating current power supply to a direct current and outputs the same to a DC link which is a direct current side; a DC link capacitor provided to the DC link; an alternating current voltage detection unit which detects an alternating current voltage crest value at an alternating current input side of the main circuit unit; a DC link capacitor voltage detection unit which detects a DC link capacitor voltage value applied to the DC link capacitor; an initial charging unit which includes a switch for opening and closing an electrical path between the main circuit unit and the DC link capacitor and a charging resistor connected in parallel to the switch, the initial charging unit initially charging the DC link capacitor by a direct current power supplied from the main circuit unit through the charging resistor during an opening period of the switch, and completing an initial charging operation of the DC link capacitor by switching the switch from to be opened into to be closed when a difference between the DC link capacitor voltage value and the alternating current voltage crest value becomes smaller than or equal to a voltage reference value; a current detection unit which detects a current value flowing into the main circuit unit or flowing out of the main circuit unit; and a voltage reference value setting unit which sets the voltage reference value in accordance with a current value as detected by the current detection unit when the switch is adapted from to be opened into to be closed.

BRIEF DESCRIPTION OF THE DRAWINGS

The present invention will be more clearly understood with reference to the following accompanying drawings:

FIG. 3A is a diagram illustrating by way of example each waveform of a DC link capacitor voltage and a current flowing into a DC link capacitor during an initial charging period in the convertor apparatus according to one embodiment, and illustrates by way of example each waveform in a first initial charging operation;

FIG. 3B is a diagram illustrating by way of example each waveform of the DC link capacitor voltage and the current flowing into the DC link capacitor during the initial charging period in the convertor apparatus according to one embodiment, and illustrates by way of example each waveform in a second initial charging operation;

FIG. 3C is a diagram illustrating by way of example each waveform of the DC link capacitor voltage and the current flowing into the DC link capacitor during the initial charging period in the convertor apparatus according to one embodiment, and illustrates by way of example each waveform in an nth initial charging operation.

DETAILED DESCRIPTION

Hereinafter, a convertor apparatus configured to optimize an initial charging time of a DC link capacitor will be described with reference to the drawings. In each figure, similar members are assigned similar reference signs. Further, it is assumed that the elements to which the same reference signs are assigned in different drawings are those having the same functions. Moreover, to facilitate understanding, these figures are suitably changed in scale.

Figure 1:
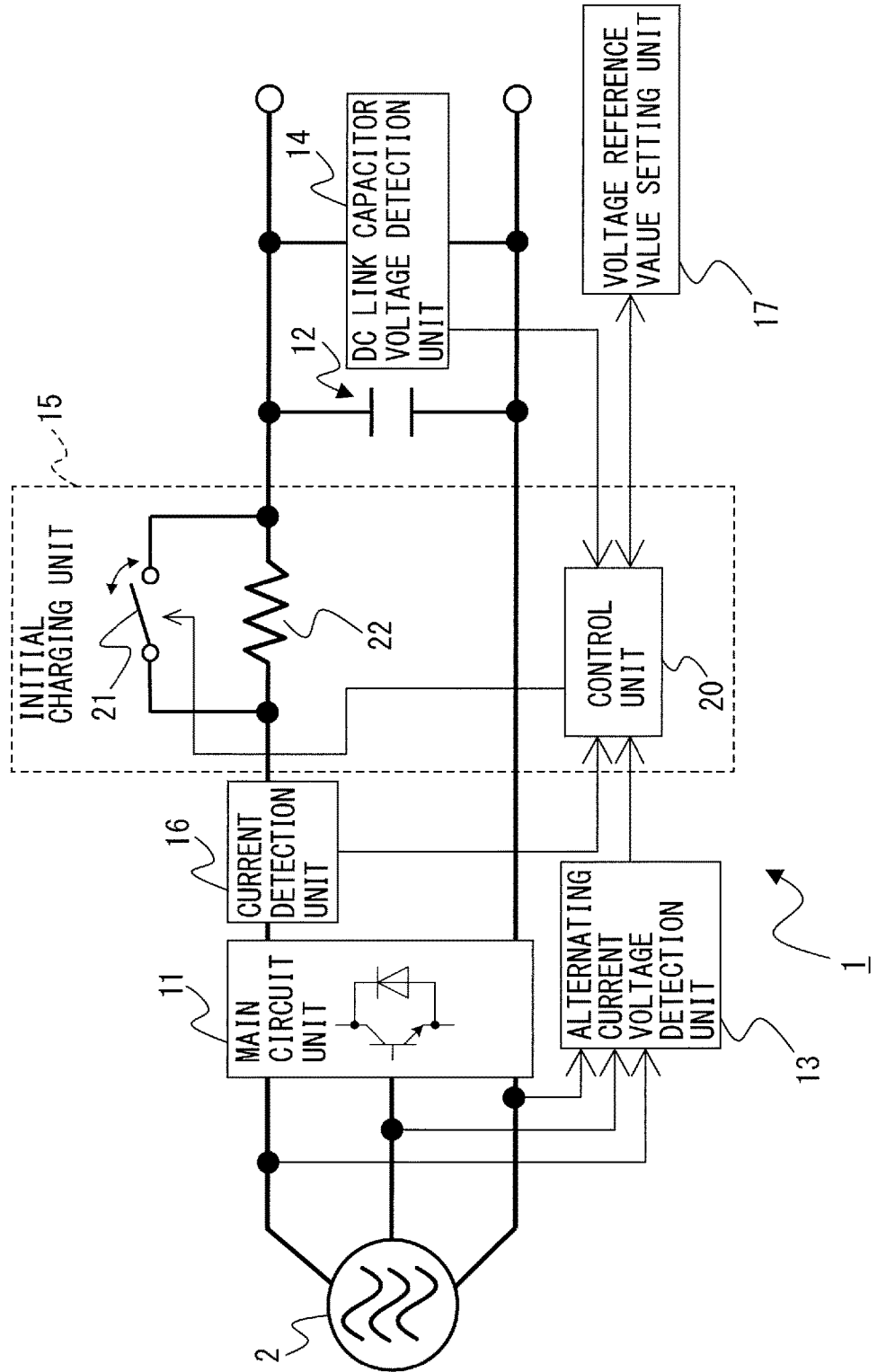
FIG. 1 is a diagram illustrating a convertor apparatus according to one embodiment.

FIG. 1 is a diagram illustrating a convertor apparatus according to one embodiment. Herein, by way of example, there will be described a case in which from an alternating current power supply 2, a three-phase alternating current is supplied to a convertor apparatus 1. Note that the number of phases of the alternating current power supply 2 is not to particularly limit the present embodiment, but, for example, a single phase may be employed.

In FIG. 1, there is omitted illustration of an apparatus connected to a DC link which is a direct current output side of the convertor apparatus 1. As the apparatus connected to the DC link which is the direct current output side of the convertor apparatus 1, for example, there are an inverter apparatus which supplies a drive power to an alternating current motor, an inverter apparatus which performs output and input of a power in relation to a flywheel type energy storage apparatus, a storage cell, and a fuel cell. A machine to which the alternating current motor is provided includes a machine tool, a robot, a forming machinery, an injection molding machine, an industrial machinery, each type of electric appliances, an electric car, a motorcar, a flying machine, etc. Further, when the convertor apparatus 1 is configured, for example, as a convertor apparatus capable of an AC/DC bidirectional power conversion, for example, a photovoltaic power generation apparatus may be also connected.

As illustrated in FIG. 1, the convertor apparatus according to one embodiment includes a main circuit unit 11, a DC link capacitor 12, an alternating current voltage detection unit 13, a DC link capacitor voltage detection unit 14, an initial charging unit 15, a current detection unit 16, and a voltage reference value setting unit 17.

The main circuit unit 11 converts an alternating current inputted from the alternating current power supply 2 to a direct current and outputs the same to the DC link which is a direct current side. In an example as illustrated, the main circuit unit 11 is composed of a three-phase bridge circuit since a three-phase alternating current is supplied from the alternating current power supply 2, but is composed of a single-phase bridge circuit when a single-phase alternating current is supplied from the alternating current power supply 2. As an example of the main circuit unit 11, there are a diode rectifier circuit, a 120° conduction type rectifier circuit, a PWM switching control type rectifier circuit, etc. When the main circuit unit 11 is a diode rectifier circuit, an alternating current inputted from the alternating current power supply 2 is rectified, and a direct current is outputted to the DC link. When the main circuit unit 11 is a 120° conduction type rectifier circuit or a PWM switching control type rectifier circuit, the main circuit unit 11 can be realized as a power conversion apparatus which converts an alternating current inputted from the alternating current power supply 2 to a direct current and outputs the same to the DC link and converts a direct current of the DC link to an alternating current and outputs the same to the alternating current power supply 2 and can thus perform an AC/DC bidirectional conversion. Further, for example, when the main circuit unit 11 is a PWM switching control type rectifier circuit, the main circuit unit 11 is composed of a bridge circuit of a switching device and a diode connected in antiparallel to the same and performs an AC/DC bidirectional power conversion by controlling each switching device to be on and off in accordance with a switching command received from a power conversion control unit (unillustrated). As an example of the switching device, there are a unipolar transistor, such as field effect transistor (FET), a bipolar transistor, an insulated gate bipolar transistor (IGBT), a thyristor, a gate turn-off thyristor (GTO), etc., but a type of the switching device itself is not to limit the present embodiment, and the other switching devices may be employed.

To the DC link which is the direct current output side of the main circuit unit 11, the DC link capacitor 12 is provided. The DC link capacitor 12 also has a function of storing a direct current power in addition to a function of restraining a ripple portion of a direct current output of the convertor 11. For example, when an inverter apparatus (unillustrated) is connected to the DC link, a direct current power stored in the DC link capacitor 12 is used so that the inverter apparatus generates an alternating current power.

The alternating current voltage detection unit 13 detects an alternating current voltage crest value ($\sqrt{2}$ times of an alternating current voltage effective value) at an alternating current input side of the main circuit unit 11. The alternating current voltage crest value as detected is transmitted to a control unit 20 in the initial charging unit 15.

The DC link capacitor voltage detection unit 14 detects a value of a DC link capacitor voltage (hereinafter referred to as "DC link capacitor voltage value") applied to the DC link capacitor 12. The DC link capacitor voltage value as detected is transmitted to the control unit 20 in the initial charging unit 15.

The initial charging unit 15 includes a switch 21 which opens and closes an electrical path between the main circuit unit 11 and the DC link capacitor, a charging resistor 22 connected in parallel to the switch 21, and the control unit 20 which controls opening and closing of the switch 21. As an example of the switch 21, there are a semiconductor switching element, such as a thyristor and an IGBT, a mechanical type switch, such as a relay, etc.

When the power of the convertor apparatus 1 is turned on and a supply of an alternating current power from the alternating current power supply 2 to the main circuit unit 11 is started, the switch 21 receives an opening command from the control unit 20 so as to be opened (off), and an initial charging is started. Since during an initial charging period, the switch 21 maintains an opened state, a current outputted from the main circuit unit 11 flows through the charging resistor 22 as a charging current into the DC link capacitor 12, and the DC link capacitor 12 is charged up. During the initial charging period, a current outputted from the main circuit unit 11 flows in the charging resistor 22 so that generation of an excessive in-rush current during the initial charging period is restrained. The control unit 20 monitors a difference (voltage difference) between the DC link capacitor voltage value as detected by the DC link capacitor voltage detection unit 14 and the alternating current voltage crest value as detected by the alternating current voltage detection unit 13. When determining that the difference between the DC link capacitor voltage value and the alternating current voltage crest value becomes smaller than or equal to a voltage reference value, the control unit 20 adapts a command outputted to the switch 21 from an opening command into a closing command. Thereby, the switch 21 is adapted from to be opened into to be closed, and an initial charging operation of the DC link capacitor 12 is completed. Since a resistance value of the switch 21 in a closed state is lower than a resistance value of the charging resistor 22, after an initial charging completion operation, a current outputted from the main circuit unit 11 flows through the switch 21 in a closed state toward each type of devices (unillustrated) connected to the DC link.

The current detection unit 16 is provided at the direct current output side of the main circuit unit 11 and detects a value of a current (hereinafter occasionally simply referred to as "current value") flowing out of the main circuit unit 11. In particular, during the initial charging period, the current detection unit 16 is mainly used to detect an in-rush current value.

The voltage reference value setting unit 17 sets the voltage reference value in accordance with a current value as detected by the current detection unit 16 when the switch 21 is adapted from to be opened into to be closed (i.e., when the initial charging operation by the initial charging unit 15 is completed). The voltage reference value set by the voltage reference value setting unit 17 is used as a determination reference of completion of a subsequent initial charging operation by the initial charging unit 15 (i.e., determination reference whether or not to adapt the switch 21 of the initial charging unit 15 from to be opened into to be closed in a subsequent initial charging). Description in more detail will be made in the following.

The voltage reference value setting unit 17 sets the voltage reference value which serves as a determination reference of completion of a subsequent initial charging operation by the initial charging unit 15 (i.e., determination reference whether or not to adapt the switch 21 from to be opened into to be closed in a subsequent initial charging) in accordance with a difference between a current value as detected by the current detection unit 16 when the switch 21 is adapted from to be opened into to be closed (i.e., when the initial charging operation by the initial charging unit 15 is completed) and a predetermined allowable in-rush current value. With respect to the allowable in-rush current value, a maximum current value of an in-rush current which fails to destroy a component constituting the converter apparatus 1. As an example of the component constituting the convertor apparatus 1, there are the diode and the switching device in the main circuit unit 11, the DC link capacitor 12, the alternating current voltage detection unit 13, the DC link capacitor voltage detection unit 14, the switch 21 and the charging resistor 22 in the initial charging unit 15, the current detection unit 16, a conducting wire, a terminal, other electronic components, etc.

When a difference between the allowable in-rush current value and a current value as detected by the current detection unit 16 when the switch 21 is adapted from to be opened into to be closed is larger than a predetermined current reference value, the voltage reference value setting unit 17 sets the voltage reference value by changing the same into a value larger than the value as already set at such a time. The predetermined current reference value will be later described. A process of changing the voltage reference value by the voltage reference value setting unit 17 allows a difference between a current value as detected by the current detection unit 16 when the switch 21 is adapted from to be opened into to be closed in a subsequent initial charging and the allowable in-rush current value to be smaller and allows the initial charging time to be closer to an optimal value, but details thereof will be later described. The voltage reference value as newly set is used as a determination reference of completion of a subsequent initial charging operation by the initial charging unit 15 (i.e., determination reference whether or not to adapt the switch 21 from to be opened into to be closed in a subsequent initial charging). Note that the voltage reference value can be optionally set by an operator with respect to a change into how large value, and may be suitably set in accordance with an environment, a use, etc., in which the convertor apparatus 1 is employed.

Further, the setting change process of the voltage reference value by the voltage reference value setting unit 17 is stopped in the following cases.

For example, the voltage reference value setting unit 17 stops the change process with respect to the voltage reference value when a difference between the allowable in-rush current value and a current value as detected by the current detection unit 16 when the switch 21 is adapted from to be opened into to be closed becomes smaller than or equal to the predetermined current reference value. Because the voltage reference value as set when a difference between the allowable in-rush current value and a current value as detected by the current detection unit 16 becomes zero is primarily an optional value, the above current reference value is ideally set to be zero. However, if the current reference value is set to be zero, there is a risk of exceeding the allowable in-rush current value so as to cause component destruction when an in-rush current contains some noise. Then, in the present embodiment, the current reference value is set to be a value close to zero with the intention of providing a slight margin. In other words, the current reference value is set to be such a value to an extent that a value of an in-rush current generated does not exceed the allowable in-rush current value, while a difference between the allowable in-rush current value and the value of the generated in-rush current is not excessively large. Note that the current reference value can be optionally set by an operator and may be suitably set in accordance with an environment, a use, etc., in which the convertor apparatus 1 is employed.

Further, by way of alternative example, it may be also configured in such a manner that the voltage reference value setting unit 17 stops the change process with respect to the voltage reference value when a difference between the allowable in-rush current value and a current value as detected by the current detection unit 16 when the switch 21 is adapted from to be opened into to be closed converges at a substantially constant value.

The change process with respect to the voltage reference value by the voltage reference value setting unit 17 as described above is performed at each time at which an initial charging operation is performed until the voltage reference value as optimizing the initial charging time is generated. In other words, the initial charging time is optimized while a normal initial charging operation is repeatedly performed, which is thus effective. For example, a machining center performs an initial charging operation at each time at which a door of a machining chamber is opened and closed. When the convertor apparatus 1 according to the present embodiment is installed incorporated into a motor drive apparatus in the machining center, the initial charging time is optimized as an initial charging operation is performed at each time at which the door of the machining chamber is opened and closed so that a tact time can be efficiently reduced.

The voltage reference value set by the voltage reference value setting unit 17 as described above enables performing of an initial charging operation with an optimized initial charging time in the convertor apparatus 1 connected to the certain alternating current power supply 2. Note that because if the alternating current power supply 2 connected to the convertor apparatus 1 is changed, a power supply impedance is changed, the voltage reference value set by the voltage reference value setting unit 17 does not provide an optimized initial charging time to the convertor apparatus 1 configured with the alternating current power supply 2 as changed. For example, in a case in which the voltage reference value which provides an optimized initial charging time with respect to the convertor apparatus 1 connected to the alternating current power supply 2 having a high power supply impedance is set by the voltage reference value setting unit 17, if the alternating current power supply 2 connected to the convertor apparatus 1 is replaced by that having a low power supply impedance, when an initial charging operation is performed while the voltage reference value as already set is used, there is a risk that an in-rush current which exceeds an allowable in-rush current value as set with respect to the convertor apparatus 1 is generated and the convertor apparatus 1 is destroyed when the switch 21 is adapted to be opened into to be closed (i.e., when the initial charging operation by the initial charging unit 15 is completed).

Then, in the present embodiment, the voltage reference value set by the voltage reference value setting unit 17 is configured to be valid only in cases in which the alternating current power supply 2 as connected to the convertor apparatus 1 when the voltage reference value is set is not replaced. Accordingly, the voltage reference value setting unit 17 resets the voltage reference value as already set when the alternating current power supply 2 as connected to the convertor apparatus 1 is replaced. With respect to the convertor apparatus 1 to which the alternating current power supply 2 as replaced, the voltage reference value setting unit 17 again performs the change process with respect to the voltage reference value, and generates the new voltage reference value which corresponds to a power supply impedance of the alternating current power supply 2 as replaced, thereby optimizing an initial charging time. Thus, according to the present embodiment, in the convertor apparatus 1 including the DC link capacitor 12 at the direct current output side, an initial charging time of the DC link capacitor can be optimized regardless of a magnitude of a power supply impedance.

Note that whether or not the alternating current power supply 2 as connected to the convertor apparatus 1 is replaced can be determined, for example, on the basis of whether or not a supply of a control power supply to the convertor apparatus 1 is cut off. The control power supply is configured to be used so as to drive each control system in the convertor apparatus 1 and can be obtained, for example, by transforming a direct current obtained by rectifying an alternating current supplied from an alternating current power supply 2 side into a direct current voltage, such as 3.3 [V], 5 [V], and 24 [V], using a DCDC convertor. When the alternating current power supply 2 is detached from the convertor apparatus 1 for replacement, a direct current is no longer supplied to the DCDC convertor so that a supply of the control power supply is cut off. Thus, it can be determined that the alternating current power supply 2 is replaced when a supply of the control power supply is cut off. Then, the voltage reference value setting unit 17 resets the voltage reference value as already set when a supply of the control power supply to the convertor apparatus 1 is cut off.

Further, by way of modification example, it may be also configured in such a manner that when a supply of the control power supply to the convertor apparatus 1 is cut off and further, an invalidation command is received, the voltage reference value setting unit 17 performs a process of invalidating a reset operation of the voltage reference value as described above (i.e., maintaining the voltage reference value as already set without resetting the same). For example, also when the alternating current power supply 2 as connected to the convertor apparatus 1 is replaced by that having a power supply impedance similar to that of such an alternating current power supply 2, a supply of the control power supply is cut off during an operation of replacing the same. If replacement by the alternating current power supply 2 having a similar power supply impedance is made, even when an initial charging operation is performed while the voltage reference value as already set is used, there is no fear that an in-rush current which exceeds an allowable in-rush current value is generated. In other words, because the voltage reference value as already set is still valid for the alternating current power supply 2 having a similar power supply impedance, it can be considered that it is useless to reset the voltage reference value as a supply of the control power supply is cut off. Then, it may be also configured in such a manner that when the alternating current power supply 2 connected to the convertor apparatus 1 is "replaced by that having a similar power supply impedance", an operator performs an input to the voltage reference value setting unit 17, for example, through an input device in exchanging an invalidation command, and the voltage reference value setting unit 17 performs a process of invalidating a rest operation of the voltage reference value as described above when such an invalidation command is received.

Further, by way of another alternative example, it may be also configured in such a manner that the voltage reference value setting unit 17 resets the voltage reference value as already set when a reset command is received. The reset command is inputted to the voltage reference value setting unit 17, for example, through an input device when an operator replaces the alternating current power supply 2 as connected to the convertor apparatus.

Note that as the input device used by an operator to input an invalidation command and a reset command as described above, there are a keyboard, a touch panel, a mouse, a speech recognition device, etc. The input device may be also a separate input device, but may be also a numerical control device which is a host controller of the motor drive apparatus, a cell control device which is a host controller of such a numerical control device, or an input device provided to a product management system which is a host controller of such a cell control device, for example, when the convertor apparatus 1 is incorporated into the motor drive apparatus.

The alternating current voltage detection unit 13, the DC link capacitor voltage detection unit 14, the control unit 20 in the initial charging unit 15, the current detection unit 16, and the voltage reference value setting unit 17 as described above may be configured, for example, in the form of a software program or may be configured by a combination of each type of electronic circuits and a software program. For example, when such units are configured in the form of a software program, a computer for an operation in accordance with such a software is provided, and an arithmetic processing unit in a numerical control device connected to the motor drive apparatus into which the convertor apparatus 1 is incorporated is allowed to operate such a software program, thereby also being capable of realizing a function of respective units as described above. Further, alternatively, the alternating current voltage detection unit 13, the DC link capacitor voltage detection unit 14, the control unit 20 in the initial charging unit 15, the current detection unit 16, and the voltage reference value setting unit 17 may be realized as a semiconductor integrated circuit in which a software program that realizes a function of such respective units is written.

Figure 2:
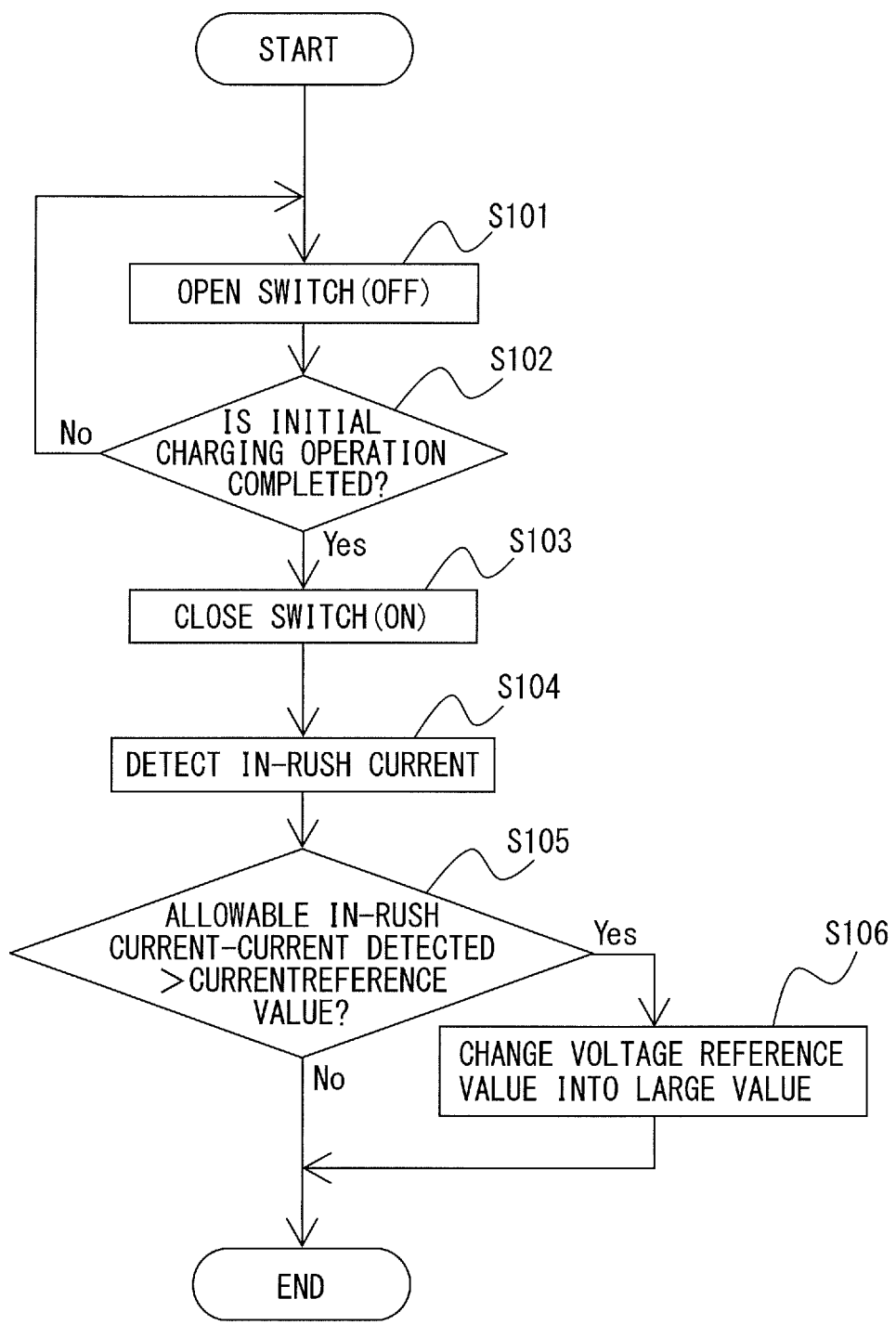
FIG. 2 is a flowchart illustrating an operation flow of an initial charging operation per single operation of the convertor apparatus according to one embodiment.

FIG. 2 is a flowchart illustrating an operation flow of an initial charging operation per single operation of the convertor apparatus according to one embodiment.

When the power of the convertor apparatus 1 is turned on and a supply of an alternating current from the alternating current power supply 2 to the main circuit unit 11 is started, at step S101, the switch 21 receives an opening command from the control unit 20 so as to be opened (off). Thereby, an initial charging operation is started. During an initial charging period, the switch 21 maintains an opened state so that a current outputted from the main circuit unit 11 flows through the charging resistor 22 as a charging current into the DC link capacitor 12, the DC link capacitor 12 is charged up, and a DC link capacitor voltage gradually increases.

At step S102, the control unit 20 determines whether or not a difference (voltage difference) between a DC link capacitor voltage value as detected by the DC link capacitor voltage detection unit 14 and an alternating current voltage crest value as detected by the alternating current voltage detection unit 13 becomes smaller than or equal to a voltage reference value, i.e., whether or not the initial charging operation is to be completed. When it is determined that the difference between the DC link capacitor voltage value and the alternating current voltage crest value becomes smaller than or equal to the voltage reference value, the initial charging operation is to be completed so that the process advances to step S103.

At step S103, the control unit 20 adapts a command outputted to the switch 21 from an opening command into a closing command. Thereby, the switch 21 is adapted from to be opened into to be closed, and the initial charging operation of the DC link capacitor 12 is completed.

At step S104, the current detection unit 16 detects an in-rush current (in more detail, a maximum value of the in-rush current) generated when the switch 21 is adapted from to be opened into to be closed (i.e., when the initial charging operation by the initial charging unit 15 is completed).

At step S105, the voltage reference value setting unit 17 determines whether or not a difference between an allowable in-rush current value and a current value (in-rush current value) as detected by the current detection unit 16 when the switch 21 is adapted from to be opened into to be closed is larger than a predetermined current reference value. At step S105, when the voltage reference value setting unit 17 determines that the difference between the allowable in-rush current value and the current value as detected by the current detection unit 16 is larger than the current reference value, the process advances to step S106. On the other hand, at step S105, when the voltage reference value setting unit 17 determines that the difference between the allowable in-rush current value and the current value as detected by the current detection unit 16 is smaller than the current reference value, it is considered that the voltage reference value as set at such a time is optimal and an initial charging time is optimized, and the initial charging operation of this time is terminated. When the initial charging operation is terminated without advancing to step S106, the current voltage reference value is maintained, but such a voltage reference value is used for an initial charging operation by the initial charging unit 15 which is performed next time.

At step S106, the voltage reference value setting unit 17 sets the voltage reference value by changing the same into a value larger than the value as already set at such a time, and terminates the initial charging operation of this time. The voltage reference value as newly set at step S106 allows a difference (current difference) between an addition of a current value (in-rush current value) as detected by the current detection unit 16 when the switch 21 is adapted from to be opened into to be closed in a subsequent initial charging and the current reference value and the allowable in-rush current value to be smaller and allows the initial charging time to be closer to an optimal value. The voltage reference value as newly set at step S106 is used for an initial charging operation by the initial charging unit 15 which is performed next time.

Note that the initial charging operation as described with reference to FIG. 2 is that per single operation, and the process is performed again from step S101 also in an initial charging operation of subsequent times.

Subsequently, specific examples of a change process of a voltage reference value by the voltage reference value setting unit will be described with reference to FIGS. 3A, 3B, and 3C.

FIG. 3A is a diagram illustrating by way of example each waveform of a DC link capacitor voltage and a current flowing into a DC link capacitor during an initial charging period in the convertor apparatus according to one embodiment, and illustrates by way of example each waveform in a first initial charging operation. FIG. 3B is a diagram illustrating by way of example each waveform of the DC link capacitor voltage and the current flowing into the DC link capacitor during the initial charging period in the convertor apparatus according to, one embodiment, and illustrates by way of example each waveform in a second initial charging operation. FIG. 3C is a diagram illustrating by way of example each waveform of the DC link capacitor voltage and the current flowing into the DC link capacitor during the initial charging period in the convertor apparatus according to one embodiment, and illustrates by way of example each waveform in an nth (n is a positive integer) initial charging operation. In FIGS. 3A, 3B, and 3C, an alternating current voltage crest value detected by the alternating current voltage detection unit 13 is indicated by an alternate long and short dash line, and an allowable in-rush current value is indicated by an alternate long and two short dash lines.

FIG. 3A illustrates by way of example a case in which in the first initial charging operation, a supply of an alternating current power from the alternating current power supply 2 to the main circuit unit 11 is started at a time zero, and the switch 21 is opened (off) so that an initial charting is started. Herein, let an initial value of a voltage reference value which serves as a determination reference of completion of an initial charging operation in the first initial charging operation be $V_{ref1}$. During an initial charging period, the switch 21 maintains an opened state so that a current outputted from the main circuit unit 11 flows through the charging resistor 22 as a charging current into the DC link capacitor 12, the DC link capacitor 12 is charged up, and a voltage gradually increases. When determining that a difference (voltage difference) between a DC link capacitor voltage value as detected by the DC link capacitor voltage detection unit 14 and an alternating current voltage crest value as detected by the alternating current voltage detection unit 13 becomes smaller than or equal to the voltage reference value $V_{ref1}$, the control unit 20 adapts a command outputted to the switch 21 from an opening command into a closing command. Thereby, the switch 21 is adapted from to be opened into to be closed, and the first initial charging operation is completed (time $t_1$). At the time $t_1$ at which the first initial charging operation is completed, between an allowable in-rush current value and a current value detected by the current detection unit 16, a current value difference $I_1$ is generated. The current value difference $I_1$ as illustrated in FIG. 3A is comparatively a large value, which means that the initial value $V_{ref1}$ of the voltage reference value is not optimal as a determination reference of completion of the initial charging operation. Then, the voltage reference value setting unit 17 changes the voltage reference value which serves as a determination reference of completion of an initial charging operation in the second initial charging operation into $V_{ref2}$ which is a value larger than $V_{ref1}$.

FIG. 3B illustrates by way of example a case in which in the second initial charging operation, a supply of an alternating current power from the alternating current power supply 2 to the main circuit unit 11 is started at a time zero, and the switch 21 is opened (off) so that an initial charting is started. During an initial charging period, the switch 21 maintains an opened state so that a current outputted from the main circuit unit 11 flows through the charging resistor 22 as a charging current into the DC link capacitor 12, the DC link capacitor 12 is charged up, and a voltage gradually increases. When determining that a difference (voltage difference) between a DC link capacitor voltage value and an alternating current voltage crest value becomes smaller than or equal to a voltage reference value $V_{ref2}$, the control unit 20 adapts a command outputted to the switch 21 from an opening command into a closing command. Thereby, the switch 21 is adapted from to be opened into to be closed, and the second initial charging operation is completed (time $t_2$). At the time $t_2$ at which the second initial charging operation is completed, between the allowable in-rush current value and a current value detected by the current detection unit 16, a current value difference $I_2$ is generated. Since the difference between the DC link capacitor voltage value and the alternating current voltage crest value at the time $t_2$ of the second initial charging operation as illustrated in FIG. 3B is larger than the difference between the DC link capacitor voltage value and the alternating current voltage crest value at the time $t_1$ of the first initial charging operation as illustrated in FIG. 3A, a larger in-rush current is generated in the second initial charging operation than in the first initial charging operation. Thus, the current value difference $I_2$ between the allowable in-rush current value and the current value detected by the current detection unit 16 in the second initial charging operation becomes smaller than the current value difference $I_1$ between the allowable in-rush current value and the current value detected by the current detection unit 16 in the first initial charging operation. Further, since the voltage reference value $V_{ref2}$ in the second initial charging operation is larger than the voltage reference value $V_{ref1}$ in the first initial charging operation, the time $t_2$ at which the switch 21 is adapted from to be opened into to be closed in the second initial charging operation is earlier than the time $t_1$ at which the switch 21 is adapted from to be opened into to be closed in the first initial charging operation. This means that the voltage reference value $V_{ref2}$ used in the second initial charging operation becomes more suitable than the voltage reference value $V_{ref1}$ used in the first initial charging operation. Further, the current value difference 12 between the allowable in-rush current value and the current value detected by the current detection unit 16 in the second initial charging operation becomes smaller than the current value difference $I_1$ between the allowable in-rush current value and the current value detected by the current detection unit 16 in the first initial charging operation so that the voltage reference value setting unit 17 sets the voltage reference value $V_{ref3}$ which serves as a determination reference of completion of an initial charging operation in the third initial charging operation to be a value larger than $V_{ref2}$.

FIG. 3C illustrates by way of example a case in which when a current value difference between a current value as detected by the current detection unit 16 when the switch 21 is adapted from to be opened into to be closed by the nth initial charging operation, and the allowable in-rush current value becomes smaller than or equal to a predetermined current reference value, a change process with respect to the voltage reference value is stopped. In a case in which the voltage reference value setting unit 17 repeats the change process with respect to the voltage reference value "n−1" times and a voltage reference value $V_{refn}$ is set before the nth initial charging operation is started, when determining that a difference between a DC link capacitor voltage value and an alternating current voltage crest value becomes smaller than or equal to the voltage reference value $V_{refn}$, the control unit 20 adapts a command outputted to the switch 21 from an opening command into a closing command. Thereby, the switch 21 is adapted from to be opened into to be closed, and the nth initial charging operation is completed (time $t_n$). At the time $t_n$ at which the switch 21 is adapted from to be opened into to be closed, when a current value difference $I_n$ between the allowable in-rush current value and the current value detected by the current detection unit 16 becomes smaller than a predetermined current reference value $I_{ref}$, the change process with respect to the voltage reference value is stopped. Because the current value difference $I_n$ as illustrated in FIG. 3C is smaller than or equal to the current reference value $I_{ref}$ which is set to such an extent that a value of an in-rush current generated does not exceed the allowable in-rush current value, while a difference between the value of the generated in-rush current and the allowable in-rush current value is not excessively large, it can be considered that the voltage reference value $V_{refn}$ as set at such a time is optimal as a determination reference of completion of the initial charging operation and thus an initial charging time is optimized.

Figure 4:
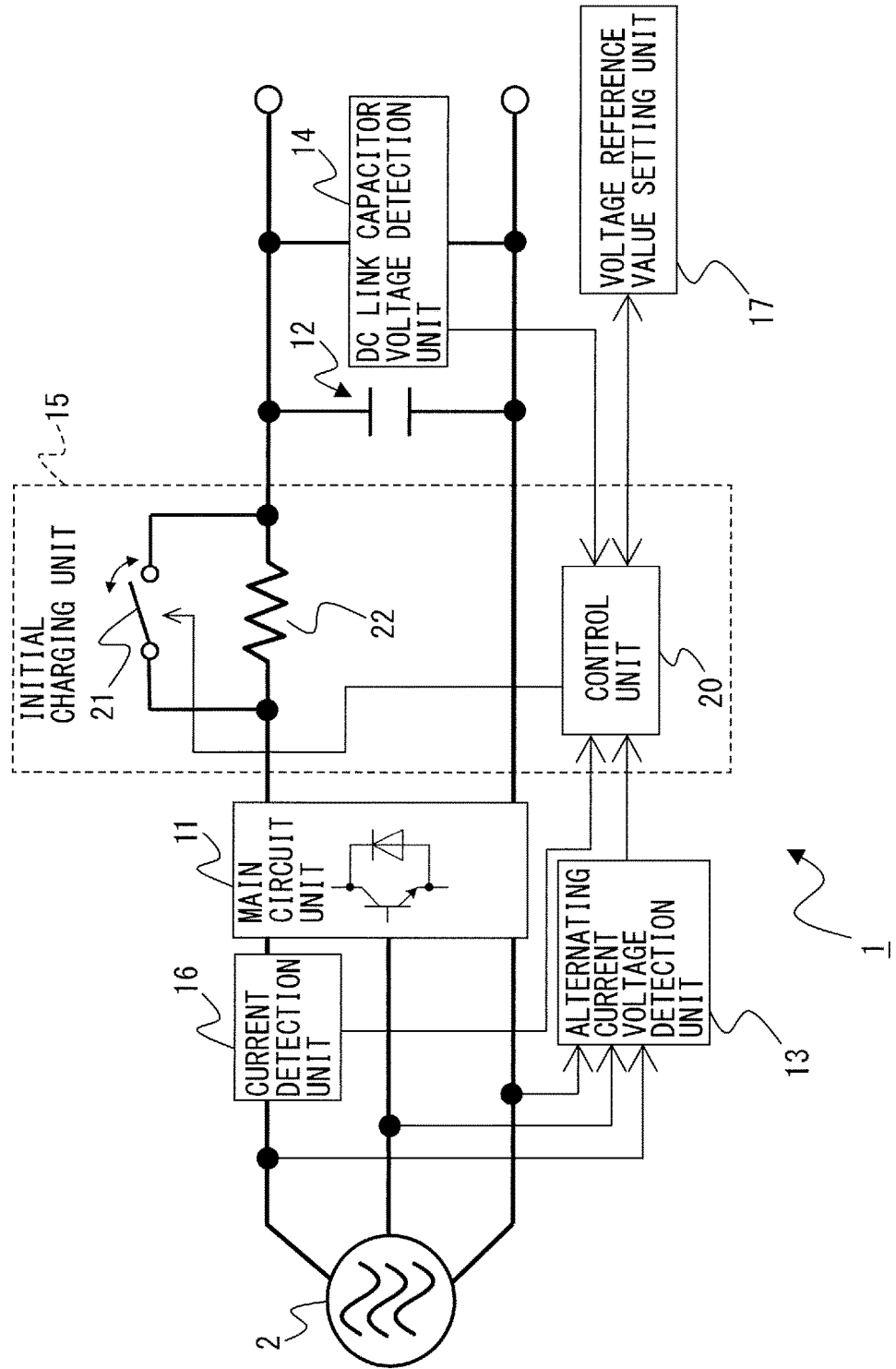
FIG. 4 is a diagram illustrating the convertor apparatus in which a current detection unit is provided at an alternating current input side of a main circuit unit according to one embodiment.

Note that in the convertor apparatus 1 as illustrated in FIG. 1, the current detection unit 16 is provided at the direct current output side of the main circuit unit 11, but may be also provided at the alternating current input side of the main circuit unit 11. FIG. 4 is a diagram illustrating the convertor apparatus in which the current detection unit is provided at the alternating current input side of the main circuit unit according to one embodiment. As illustrated in FIG. 4, the current detection unit 16 is provided at the alternating current input side of the main circuit unit 11 and detects a value of a current flowing into the main circuit unit 11. Because a current outputted from the main circuit unit 11 to the DC link is generated on the basis of an alternating current inputted from the alternating current power supply 2, an in-rush current emerging in the DC link emerges as an unexpectedly large current also at the alternating current input side of the main circuit unit 11. Thus, even when the current detection unit 16 is provided at the alternating current input side of the main circuit unit 11, an in-rush current value during an initial charging period can be detected. The other circuit constitutional elements are similar to the circuit constitutional elements as illustrated in FIG. 1, and accordingly, a detailed description thereof is omitted.

According to one aspect of the present disclosure, in the convertor apparatus including the DC link capacitor at the direct current output side, there can be realized the convertor apparatus configured to optimize an initial charging time of the DC link capacitor regardless of a magnitude of a power supply impedance.

According to one aspect of the present disclosure, a change process with respect to a voltage reference value by the voltage reference value setting unit is performed at each time at which an initial charging operation is performed so that an initial charging time can be efficiently optimized. For example, a machining center performs an initial charging operation at each time at which a door of a machining chamber is opened and closed, while, according to one aspect of the present disclosure, a time required for an initial charging operation is gradually optimized in each initial charging operation performed as the door of the machining chamber is opened and closed so that a tact time of the machining center can be efficiently reduced.

Further, according to one aspect of the present disclosure, a voltage reference value set by the voltage reference value setting unit is valid only in cases in which the alternating current power supply as connected to the convertor apparatus when the voltage reference value is set is not replaced, and the voltage reference value is reset when the alternating current power supply is replaced so that there is no risk that the convertor apparatus is destroyed by an in-rush current even when replacement by an alternating current power supply having a different power supply impedance is made.

Moreover, according to one aspect of the present disclosure, with respect to the convertor apparatus connected to the alternating current power supply as replaced, a change process with respect to a voltage reference value is again performed, a new voltage reference value which corresponds to a power supply impedance of the alternating current power supply as replaced is generated, and an initial charging time of the DC link capacitor can be easily optimized regardless of a magnitude of a power supply impedance.

The invention claimed is:

1. A convertor apparatus comprising:
a main circuit unit which converts an alternating current inputted from an alternating current power supply to a direct current and outputs the direct current to a DC link which is a direct current side;
a DC link capacitor provided to the DC link;
an alternating current voltage detection unit which detects an alternating current voltage crest value at an alternating current input side of the main circuit unit;
a DC link capacitor voltage detection unit which detects a DC link capacitor voltage value applied to the DC link capacitor;
an initial charging unit which includes a switch for opening and closing an electrical path between the main circuit unit and the DC link capacitor and a charging resistor connected in parallel to the switch, the initial charging unit initially charging the DC link capacitor by a direct current power supplied from the main circuit unit through the charging resistor during an opening period of the switch, and completing an initial charging operation of the DC link capacitor by switching the switch from to be opened into to be closed when a difference between the DC link capacitor voltage value and the alternating current voltage crest value becomes smaller than or equal to a voltage reference value;
a current detection unit which detects a current value flowing into the main circuit unit or flowing out of the main circuit unit; and
a voltage reference value setting unit which changes the voltage reference value to a new voltage reference value in accordance with the current value as detected by the current detection unit, the new voltage reference value used by the initial charging unit for controlling the switch in a subsequent initial charging of the DC link capacitor.

2. The convertor apparatus according to claim 1, wherein the voltage reference value setting unit sets the voltage reference value in accordance with a difference between a predetermined allowable in-rush current value and the current value as detected by the current detection unit when the switch is adapted from to be opened into to be closed.

3. The convertor apparatus according to claim 2, wherein the voltage reference value setting unit sets the voltage reference value by changing the voltage reference value into a value larger than a value as already set when a difference between the allowable in-rush current value and the current value as detected by the current detection unit when the switch is adapted from to be opened into to be closed is larger than a predetermined current reference value.

4. The convertor apparatus according to claim 3, wherein the voltage reference value setting unit stops a change process with respect to the voltage reference value when a difference between the allowable in-rush current value and the current value as detected by the current detection unit when the switch is adapted from to be opened into to be closed is smaller than the current reference value.

5. The convertor apparatus according to claim 3, wherein the voltage reference value setting unit stops a change process with respect to the voltage reference value when a difference between the allowable in-rush current value and the current value as detected by the current detection unit when the switch is adapted from to be opened into to be closed converges at a substantially constant value.

6. The convertor apparatus according to claim 1, wherein the voltage reference value setting unit resets the voltage reference value as already set when a supply of a control power supply to the convertor apparatus is cut off.

7. The convertor apparatus according to claim 1, wherein the voltage reference value setting unit resets the voltage reference value as already set when a reset command is received.

* * * * *